United States Patent [19]

Wang et al.

[11] Patent Number: 5,084,165

[45] Date of Patent: Jan. 28, 1992

[54] WATER TREATMENT APPARATUS

[75] Inventors: Lawrence K. Wang; Mu Hao S. Wang, both of Latham; Chong Sup Hwang, Flushing; Harold Rhow, Hartsdale, all of N.Y.

[73] Assignees: Int'l Environmental Systems, Inc., Pittsfield, Mass.; Globe Environmental Protection, Inc., Flushing, N.Y.

[21] Appl. No.: 549,430

[22] Filed: Jul. 6, 1990

[51] Int. Cl.$^5$ .............................................. C02F 1/24
[52] U.S. Cl. ................................. 210/96.1; 210/197; 210/202; 210/207; 210/221.2; 210/223; 210/260
[58] Field of Search .............................. 210/703–705, 210/96.1, 195.1, 196, 197, 202, 203, 205, 220, 221.1, 221.2, 223, 260, 262, 275, 525, 530, 207

[56] References Cited

U.S. PATENT DOCUMENTS

| | | | |
|---|---|---|---|
| 3,171,804 | 3/1965 | Rice | 210/724 |
| 3,307,701 | 3/1967 | Krofta | 210/195.1 |
| 3,403,096 | 9/1968 | Mackrie et al. | 210/202 |
| 3,408,288 | 10/1968 | Messa | 210/202 |
| 3,429,442 | 2/1969 | Mackrle et al. | 210/202 |
| 3,820,659 | 6/1974 | Parlette | 210/195 |
| 4,022,696 | 5/1977 | Krofta | 210/520 |
| 4,151,093 | 4/1979 | Krofta | 210/386 |
| 4,157,952 | 6/1979 | Krofta | 209/170 |
| 4,184,967 | 1/1980 | Krofta | 210/525 |
| 4,303,517 | 11/1981 | Love et al. | 210/208 |
| 4,377,485 | 3/1983 | Krofta | 210/704 |
| 4,626,345 | 12/1986 | Krofta | 210/104 |
| 4,626,346 | 11/1986 | Hall | 210/110 |
| 4,673,494 | 7/1987 | Krofta | 210/202 |
| 4,673,498 | 6/1987 | Swinney et al. | 210/275 |
| 4,673,500 | 6/1987 | Hoofnagle et al. | 210/307 |
| 4,931,175 | 6/1990 | Krofta | 210/86 |

OTHER PUBLICATIONS

The U.S. Dept. of Commerce, National Technical Information Service (NTIS) Report #PB 89-158,398 (1988).

L. K. Wang, U.S. Department of Commerce, National Technical Information Service, Springfield, Va., U.S.A. Technical Report No. PB89-158398/AS, Oct. 1988.

L. K. Wang and W. J. Mahoney, Proceedings of the 44th Industrial Waste Conference, pp. 655–666, May 1989.

L. K. Wang and M. H. S. Wang and W. J. Mahoney, Proceedings of the 44th Industrial Waste Conference, pp. 667–673, May 1989.

L. K. Wang and M. H. S. Wang, Proceedings of the 44th Industrial Waste Conference, pp. 493–504, May 1989.

*Primary Examiner*—Peter Hruskoci
*Attorney, Agent, or Firm*—Birch, Stewart, Kolasch & Birch

[57] ABSTRACT

A water treatment multi-stage process and apparatus thereof for removing dissolved, colloidal, volatile, suspended and living contaminants from water, wastewater or sludge streams which includes chemical feeding, static mixing, flotation chemical monitoring and optimization, gas pressurization, hydraulic flocculation, sedimentation, flotation, and final water treating by converting dissolved solids to insoluble forms by oxidation and chemical precipitation, coagulating and clarifying colloidal substances and microorganisms, magnetic or electronic treating the remaining contaminants in the water to produce a purified water. A majority of insoluble suspended particles in the water are collected by sedimentation and flotation separation procedures and subsequently dewatered and dried and all necessary unit processes operations are incorporated into an apparatus with common walls and drive mechanisms for improviding the water treatment efficiency, reducing secondary pollution caused by scums/sludges, and eliminating the needs of a separate mixer, monitor, flocculator, pressure vessel, clarifier, aerator, biofouling preventor, and scale and corrosion controller.

3 Claims, 3 Drawing Sheets

WATER TREATMENT APPARATUS

BACKGROUND OF THE INVENTION

1. Field of the Invention

The present invention relates to a water treatment process and an apparatus thereof and more particularly, to a multistage process and a package apparatus thereof for removal of dissolved, colloidal, suspended, volatile, and living contaminants from water or wastewater.

2. Description of the Prior Art

Various types of water treatment processes are well known in the art. In such processes, the suspended contaminants in water are commonly removed by a sedimentation separation procedure wherein the particles in suspension have a specific gravity greater than that of the water in which they are suspended. When the specific gravity of the suspended contaminants is similar to that of the water, then a dissolved air flotation separation procedure is more effective and is employed Several types of prior art processes have been developed for the separation of suspended particulates from a water.

It has been a standard practice for engineers to construct separate water treatment units to remove dissolved, colloidal, suspended, volatile and living contaminants, and to construct separate aeration units for oxidation, air dissolving, distribution, corrosion control, biological fouling control, and scale control For example, for soluble iron and manganese removal in a conventional water treatment system, an aerator or an oxidizer is required to convert a soluble contaminant to its insoluble form by oxidation. Conventionally, chlorination is used for biological fouling control. Hardness reduction or softening is essential for scale control, and pH adjustment and anti-corrosion agent are needed for corrosion control.

Both such conventional sedimentation systems and conventional flotation systems involve the use of separate mixers, monitors, flocculators, chlorinators, softeners, clarifiers, and anticorrosion chemical feeders.

Particularly, such conventional flotation systems require separate pressure vessels for dissolving gas and for gas bubble generation. Therefore, the capital costs and land space requirements of such conventional flotation and sedimentation systems are high.

Such conventional water and wastewater treatment processes and apparatuses therefor are described in the U.S. Pat. No. 3,171,804 to Rice, U.S. Pat. No. 3,307,701 to Krofta, U.S. Pat. No. 3,820,659 to Parlette, U.S. Pat. No. 4,022,696 to Krofta, U.S. Pat. No. 4,151,093 to Krofta, U.S. Pat. No. 4,157,952 to Krofta, U.S. Pat. No. 4,184,967 to Krofta, U.S. Pat. No. 4,303,517 to Love et al, U.S. Pat. No. 4,377,485 to Krofta, U.S. Pat. No. 4,626,345 to Krofta, U.S. Pat. No. 4,626,346 to Hall, U.S. Pat. No. 4,673,494 to Krofta, U.S. Pat. No. 4,673,498 to Swinney et al, U.S. Pat. No. 4,673,500 to Hoofnagle et al and L. K. Wang, Using Air Flotation and Filtration in Color and Giardia removal. U.S. Department of Commerce, National Technical Information Service, Springfield, Virginia, USA. Technical Report No. PB89-158398/AS October 1988 L. K. Wang and W. J. Mohoney. Treatment of Storm Run-off by Oil-Water Separation, Flotation, Filtration and Adsorption, Part A: Wastewater Treatment. Proceedings of the 44th Industrial Waste Conference, P. 655–666, May 1989. L. K. Wang, M. H. S. Wang and W. J. Mahoney. Treatment of Storm Run-off by Oil-Water Separation, Flotation, Filtration and Adsorption: Part B: Waste Sludge Management. Proceedings of the 44th Industrial Waste Conference, P. 667–673, May 1989. L. K. Wang, M. H. S. Wang, Bubble Dynamics and Air Dispersion Mechanisms of Air Flotation Process Systems, Part A: Material Balances Proceedings of the 44th Industrial Waste Conference, P. 493–504, May 1989.

SUMMARY OF THE INVENTION

Accordingly, it is an object of the present invention to provide an improved water treatment apparatus.

Another object of the present invention to provide a combined process system and apparatus having a number of unique design features for improving water treatment efficiency and cost saving.

A further object of the present invention is to provide a combined water treating multistage apparatus for eliminating the need of many separate treatment units or devices in comparable conventional water treatment processes such as a (a) mechanical mixer, (b) jar test apparatus for chemical dosage determination, (c) mechanical flocculator, (d) sedimentation clarifier, (e) flotation clarifier, (f) pressure retention tank for gas dissolving, (g) special aeration tower for iron and manganese removal, (h) additional clarifier for hardness removal, (i) flow meters for recycle flow determination, and (j) additional process units for biological fouling control, scale control and corrosion control. While the aforementioned conventional treatment units or devices may be eliminated for cost saving, one or more of them may be adopted to the present invention as a standby when desired or when the duplicate units are required by the monitoring agencies.

Still another object of the present invention is to provide a water treatment apparatus having a pressurized water flow in a pressure vessel such as a gas dissolving tube which is inside of the apparatus and generates gas bubbles depending on the contaminants to be removed so as to treat potable water, wastewater, and liquid sludge, remove suspended particulates, and dissolved, colloidal, living and volatile contaminants.

Yet another object of the present invention is to provide a water treatment apparatus including (a) special chemical monitor which accepts signals from a streaming current defector, a turbidimeter, a spectrophotometer, a pH meter and the combination thereof for flotation chemical optimization; (b) the pressured water to be directed to a flotation chamber being maintained under pressure until the moment of its release in the flotation chamber without long distance complication since this is accomplished by a built-in pressure vessel; (c) special pressure relief pipes in the flotation chamber rather than in the conduit leading to that flotation chamber, which ensures that the air bubbles released in the flotation chamber will be as small as possible, thereby improving aeration and flotation; and (d) an in-line electronic or magnetic water treater for control of biological fouling, scale and corrosion.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a water treatment multi-stage process and apparatus which includes chemical feeding, static mixing, flotation chemical monitoring, built-in gas pressurization, hydraulic flocculation, sedimentation, flotation, effluent recycle, and effluent treatment. Therefore the present invention is for removing dissolved, colloidal, volatile, suspended and living contaminants from water, wastewater or sludge streams by converting dissolved solids to insoluble forms by oxidation and chemical precipitation, coagulating and separating colloidal and suspended substances and microorganisms, to produce a purified water and a concentrated scum. That is, a majority of original and newly formed insoluble suspended particles in water is collected by sedimentation clarification and flotation clarification and all necessary unit process operations are incorporated into an apparatus with common walls and drive mechanisms for improving the water treatment efficiency, and thereby eliminating the needs of various separate components including a mixer, chemical monitors, flocculator, pressure vessel, clarifier, aerator, chlorinator, scale controller and corrosion controller.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
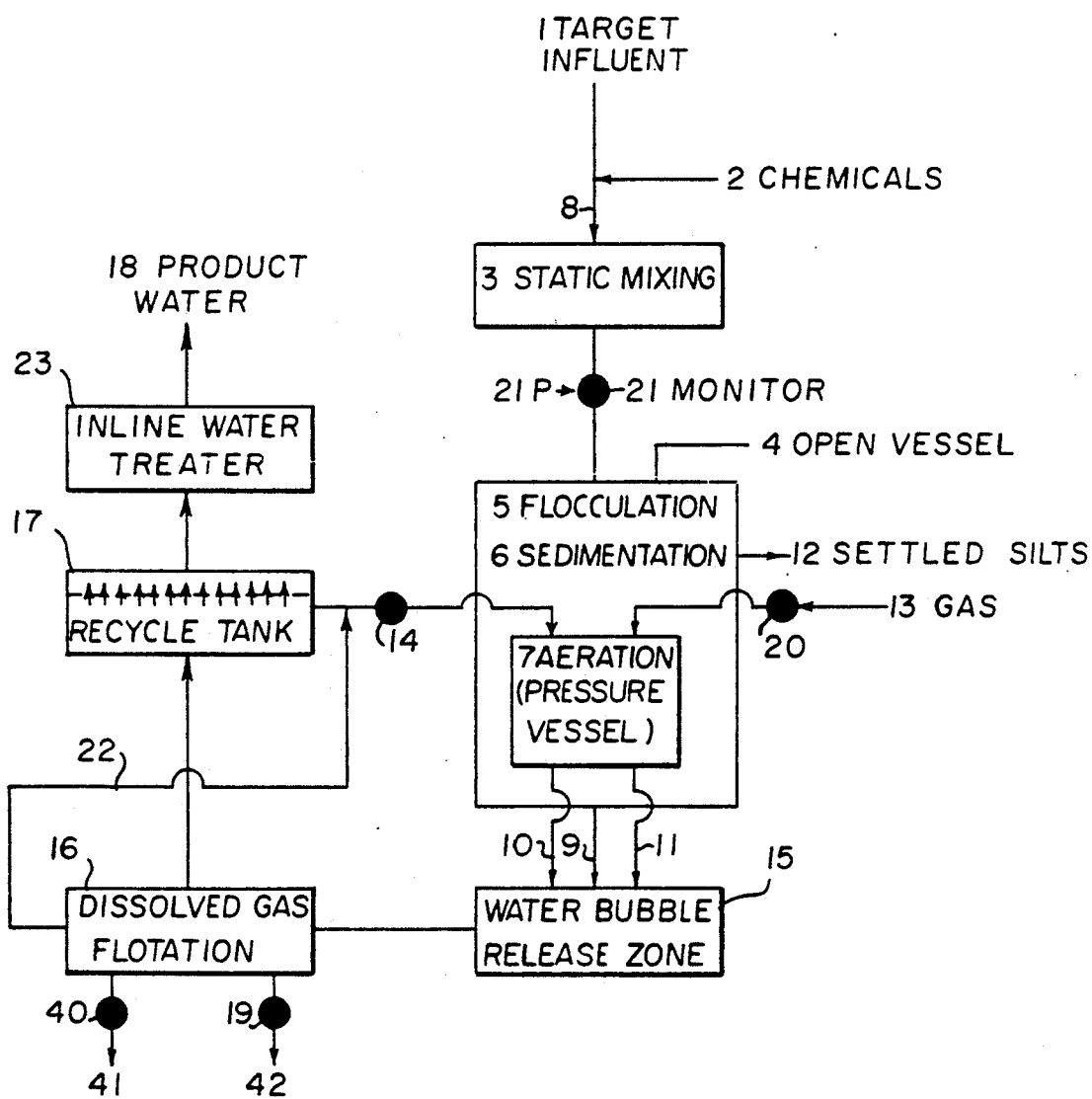
FIG. 1 shows the overall process according to the present invention.
Figure 2:
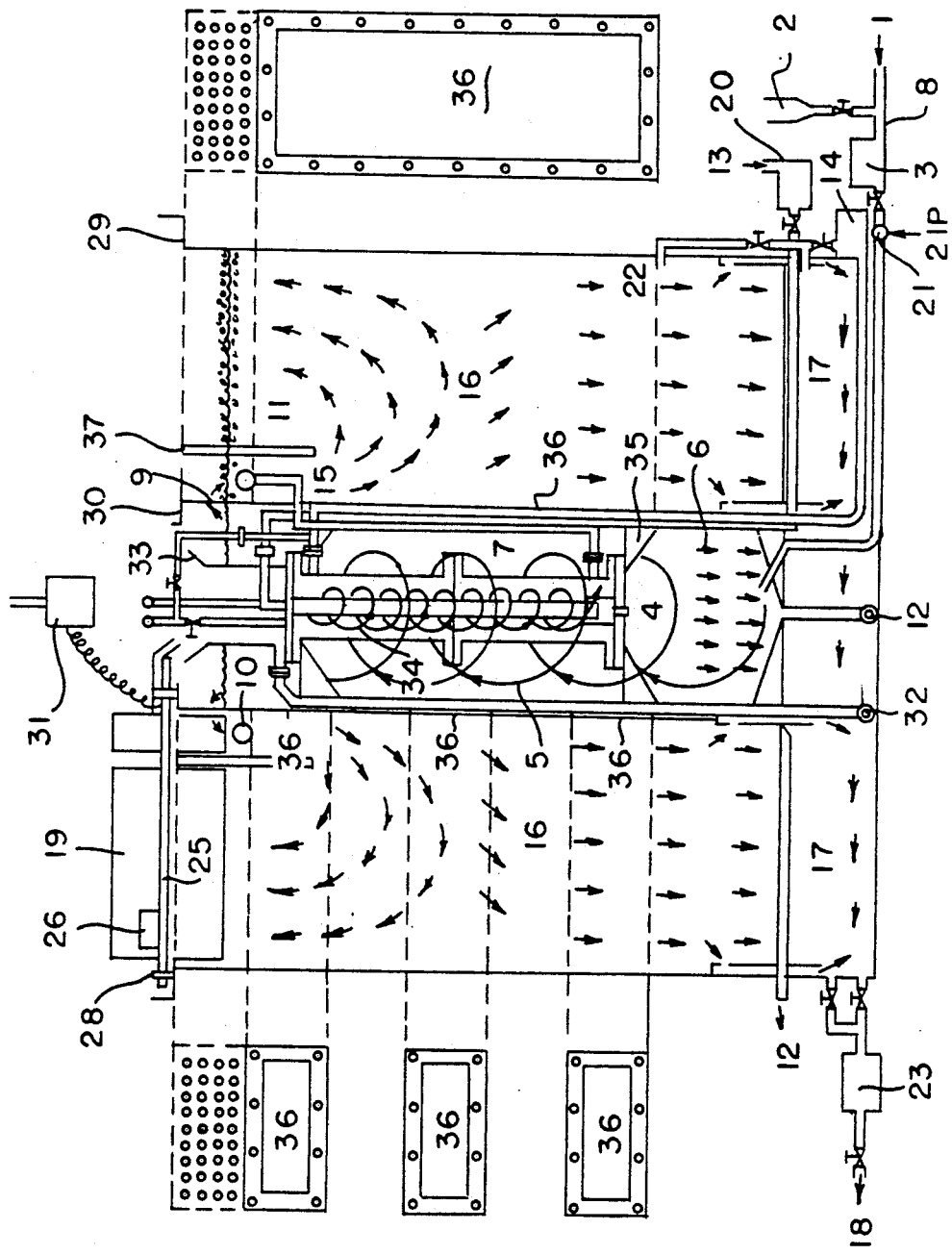
FIG. 2 is sectional view of the apparatus according to the present invention.
Figure 3:
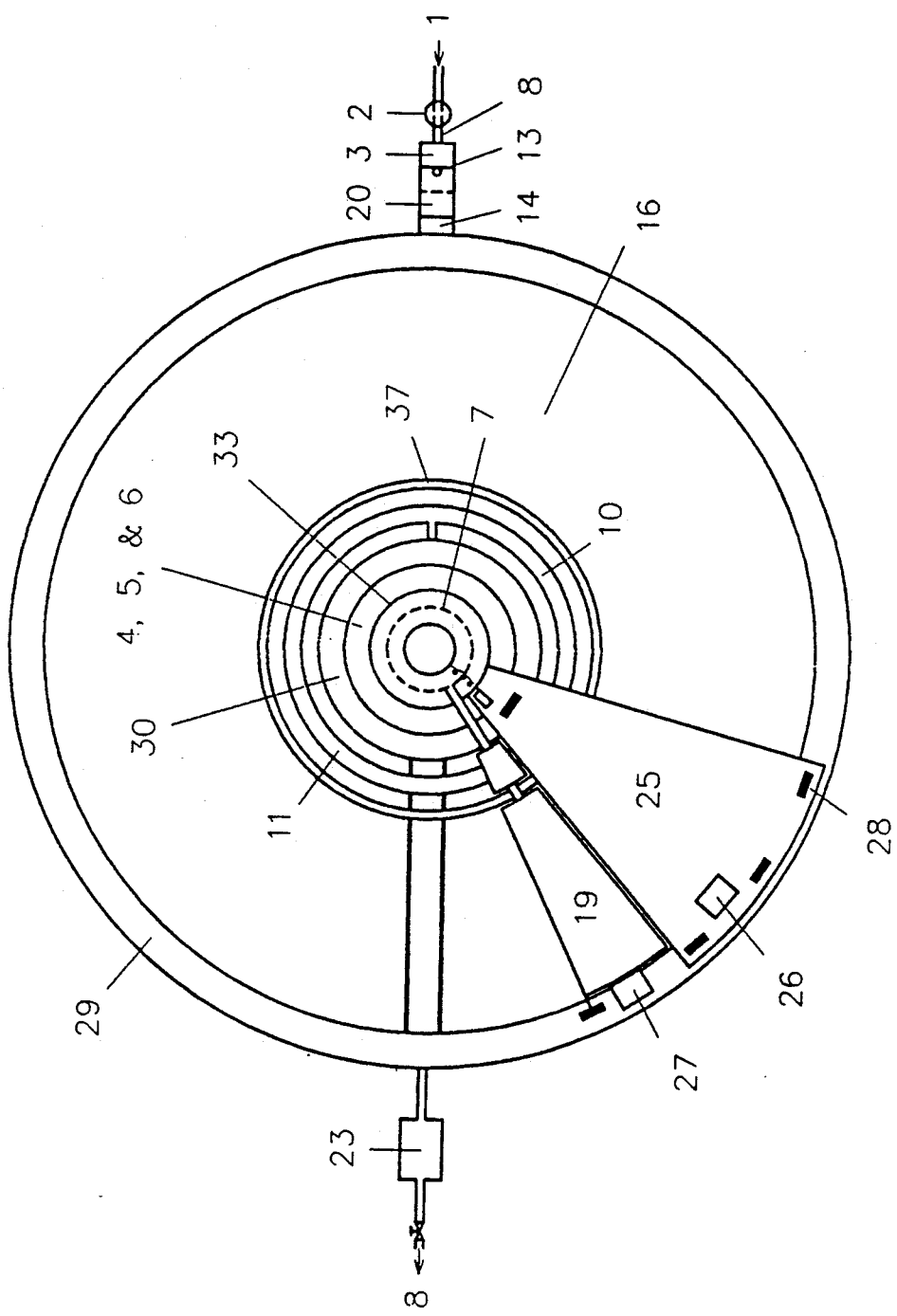
FIG. 3 is a top plan view according to the apparatus of the present invention.

Referring now in detail to the drawings for the purpose of illustrating preferred embodiments of the present invention, the water treatment process and the apparatus thereof are shown in the process steps of FIGS. 1, 2, and 3, which includes the steps of chemical feeding, static mixing, monitoring, flocculating, sedimentating, aerating, gas dissolving in a pressure vessel, water-bubble releasing, floating, effluent recycling and effluent conditioning, for removal of dissolved, suspended, colloidal, volatile and living contaminants from a water or wastewater stream. As shown in FIG. 1, the target influent 1 can be water, wastewater or a liquid sludge stream such as river water, lake water, reservoir water, ground water, sea water, sewage, industrial water, industrial effluent, liquid sludge, or combination thereof. First chemicals 2 can be added to the target influent 1 when necessary. The influent-chemical mixture is pumped through an inlet pipe 8 to a static mixing member 3 and an unique flotation chemical monitor 21, and then to a cylindrical open vessel 4 at a tangential direction where flocculation 5 and sedimentation 6 occur simultaneously. The static mixing 3 is for improved chemical mixing.

Gas or air 13 is compressed by a gas compressor 20 and added in varied amounts to a cylindrical pressure vessel 7 which is inside of the cylindrical open vessel 4. The gas 13 is selected from the group consisting of gaseous air, nitrogen, oxygen and combination thereof. Settled silts 12 disposed at the bottom of the cylindrical open vessel 4 are discharged periodically to a scum and sludge collector (not shown). A measuring member can be provided on the apparatus for measuring the flow rates of water and various gases in the inlet pipe 8, the open vessel 4, and the cylindrical pressure vessel 7, respectively. The water from a recycle tank 17 or a flotation clarified water 22 is pumped into the pressure vessel 7 by a pressure pump 14 at the same time when the gas 13 is pumped by a gas compressor 20 to the same pressure vessel 7 for dissolving the gas 13 into the water under pressure. An effluent of the pressure vessel 7 containing super-saturated gas passes through unique water-bubble release rings 10 and 11 in an outer tank between an inner rail 30 and a baffle 37, and enters a liquid bubble release zone 15 where it meets an open vessel effluent 9 of the open vessel 4 (FIG. 2). The mixture of the open vessel effluent 9 and the pressure vessel effluent from the rings 10 and 11 flow to a dissolved gas flotation chamber 16 from where the flotation effluent flows downward to a recycle tank 17. The floated scum from the dissolved gas flotation chamber 16 is collected by a sludge scoop collector 19. Part of the effluent from the recycle tank 17 is recycled by a pressure pump 14 to the pressure vessel 7 with gas injection from the gas compressor 20.

The remaining effluent of the recycle tank 17 is first treated by an in-line electronic or magnetic water treater 23 and then discharged as a product water 18. Alternatively, a flotation clarified water 22 from the dissolved gas flotation 16 can be recycled by the pressure pump 14 to the pressure vessel 7 for bubble generation so the recycle tank 17 can be eliminated for cost saving. The scum and sludge in the sludge scoop collector 19 is collected and treated separately.

The unique monitor 21 monitors and controls the pH, turbidity and streaming current of the coagulated water entering the open vessel 4. The monitor 21 is especially useful when treating water with low alkalinity or maintaining optimal pH ranges for the flotation clarification of color, iron and manganese The monitor 21 also feeds pH buffer chemicals 21P as a fixed but adjustable percentage of the primary coagulant dosage or in direct response to measured pH. The monitor 21 is capable of reacting quickly to rapid and wide optical density swings and accepts the signals from a streaming current detector, a turbidimeter, a spectrophotometer and/or a pH meter for flotation chemical control.

The unique in-line electronic or magnetic water treater 23 has no moving parts, and inhibits biological fouling and corrosion. The in-line water treater 23 also descales the water treatment system and equipment.

As shown in FIGS. 2 and 3, a baffle ring 37 between the waterbubble release zone 24 and the flotation chamber 16 may be about 1 to 2 feet below the water surface. A moving carriage 25 has a platform on which are mounted a first driving motor 26 for the entire moving carriage 25, the sludge scoop collector 19, and a second driving motor 27 for the sludge scoop collector 19. The rotation direction of the moving carriage 25 can be either counterclockwise or clockwise. The rotation speeds of both the moving carriage 25 and the sludge scoop collector 19 are adjustable. There are rollers 28 carrying the weight of the entire moving carriage 25 and rolling on an outer rail 29 and an inner rail 30.

At the top and center of present invention's apparatus, there is an universal joint 31 for delivering power source to the entire apparatus. Immediately below the universal joint 31, there is a sludge collecting member 33 for receiving and discharging the wet sludge from the sludge scoop collector 19 to a lower location 32. At the center but below the sludge collecting member 33, there is the pressure vessel 7 as the gas dissolving tubes. The center of the pressure vessel 7 is a plastic porous tube 34 for uniform distribution of compressed gas into water throughout the entire pressure vessel 7. The pressure vessel 7 is supported by stainless steel angles 35, bolted at the center of the open vessel 4. Sufficient numbers of service windows 36 which are bolted along the outer wall of the open vessel 4 making the pressure vessel 7 accessible for service when necessary.

According to the present invention, in the process of the present invention, contaminants such as iron, manganese, and other reducing substances are oxidized. Calcium and magnesium hardness are precipitated. Colloidal substances are coagulated and destabilized. All original and newly formed insoluble particles in water are collected by the sedimentation separation in the open vessel 4 and by flotation separation in the flotation chamber 16 at atmospheric pressure The purified water passes through the recycle tank 17 and the effluent water treater 23 before discharge as the product water 18. The settled sludge 41 is collected from flocculation tank bottom 40 by gravity. The floated scum 42 is collected from the flotation water surface by the sludge scoop collector 19. Both the scums and the sludges are chemically conditioned, dewatered, and dried for final disposal.

For the invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. An apparatus for treating water, comprising in combination an inlet pipe with an in-line static mixing member for introducing water into said apparatus, means for feeding chemical to said inlet pipe carrying said water, a built-in flotation monitor accepting signals of pH, streaming current, turbidity, and optical density and adjusting the feeding of said chemical, a cylindrical outer tank having the bottom thereof as an outside wall of said apparatus, means for connecting said flotation monitor to said inlet pipe, means for feeding pH buffer chemical to said inlet pipe in response to said flotation monitor, a cylindrical inner open vessel disposed within said outer tank for flocculation and sedimentation, means for introducing water tangentially into the bottom said cylindrical inner open vessel, means for removing settled, heavy silts, and sludges from the bottom of said open vessel, means for introducing effluent from said inner open vessel into said outer tank, a cylindrical inner pressure vessel positioned within said open vessel for aeration and gas dissolution under pressure to produce water containing super-saturated air pressure, means for tangentially introducing water into said pressure vessel, means for introducing gas to be pressurized into said pressure vessel through a porous tube so as to create a uniform flow pattern for dissolving gas, means for measuring th flow rates of water and various gases in said inlet pipe, open vessel, and pressure vessel, releasing means for introducing the water containing super-saturated air to be depressurized and clarified from said pressure vessel into said outer tank for mixing with said effluent bubble generation and flotation purification, sludge scooping and scraping means for removing floated sludge from the liquid surface of said outer tank, sludge hopper and scraper blade means for removing settled, heavy sludges from the bottom of said outer tank, sludge discharge means for transporting said floated sludge through a sludge collection member to a dewatering device, a recycle tank over the bottom of said outer tank for collection of flotation purified water, an outlet for discharging said flotation purified water form said recycle tank to an in-line water treater and then to discharge as a product water, a moving carriage having a platform supported between the upper portion of the wall of said outer tank and the upper portion of the wall of said open vessel so as to hold said releasing means, sludge scooping and scraping means, and driving motors, means for circular moving said moving carriage together with said releasing means, sludge scooping, and scraping means, and driving motors along outer and inner rails on said apparatus and around the vertical axis of said apparatus, means for recycling a portion of water form said recycle tank into said pressure vessel to form water to be pressurized ten depressurized and clarified, and means for generating an electronic or magnetic field in the in-line water treater for control of biological fouling, scaling and corrosion.

2. The apparatus of claim 1, wherein the pressure vessel is constructed and arranged to operate in conjunction with another vessel outside said apparatus.

3. The apparatus of claim 1, wherein the releasing means for introducing the pressured water to be depressurized and clarified from said pressure vessel into said outer tank is either single stage releasing means or multiple stage releasing means.

* * * * *